United States Patent [19]

Habicht

[11] Patent Number: 4,462,567

[45] Date of Patent: Jul. 31, 1984

[54] DISCHARGE VALVE FOR GRANULAR MATERIALS

[76] Inventor: Helmut Habicht, 15 Royal Park Ter., Hillsdale, N.J. 07642

[21] Appl. No.: 437,270

[22] Filed: Oct. 28, 1982

[51] Int. Cl.³ .................... F16K 31/528; F16K 1/22
[52] U.S. Cl. .................................. 251/297; 251/308
[58] Field of Search ............... 251/305, 306, 307, 308, 251/297; 16/111 R, 118, 121, DIG. 30; 74/553, 555, 557

[56] References Cited

U.S. PATENT DOCUMENTS

| | | | |
|---|---|---|---|
| 1,977,351 | 10/1934 | Phillips | 251/306 |
| 2,657,896 | 7/1948 | Muller | 251/306 |
| 2,889,963 | 6/1959 | Johnson | 251/306 |
| 2,912,218 | 11/1959 | Stillwagon | 251/306 |
| 3,100,500 | 8/1963 | Stillwagon | 251/306 |
| 3,299,904 | 1/1967 | Burke | 251/297 |
| 3,902,694 | 9/1975 | Friedell | 251/308 |
| 4,032,108 | 6/1977 | Kintner | 251/306 |

Primary Examiner—Martin P. Schwadron
Assistant Examiner—James R. Shay
Attorney, Agent, or Firm—Anthony F. Cuoco

[57] ABSTRACT

A discharge valve for granular materials is disclosed which includes a valve body and a disc pivotally supported within the body. The arrangement is such that the disc rests against the body when the valve is closed to provide a seal therewith, and is pivoted by a resiliently biased handle to a plurality of open positions for controlling the flow of material through the valve.

2 Claims, 5 Drawing Figures

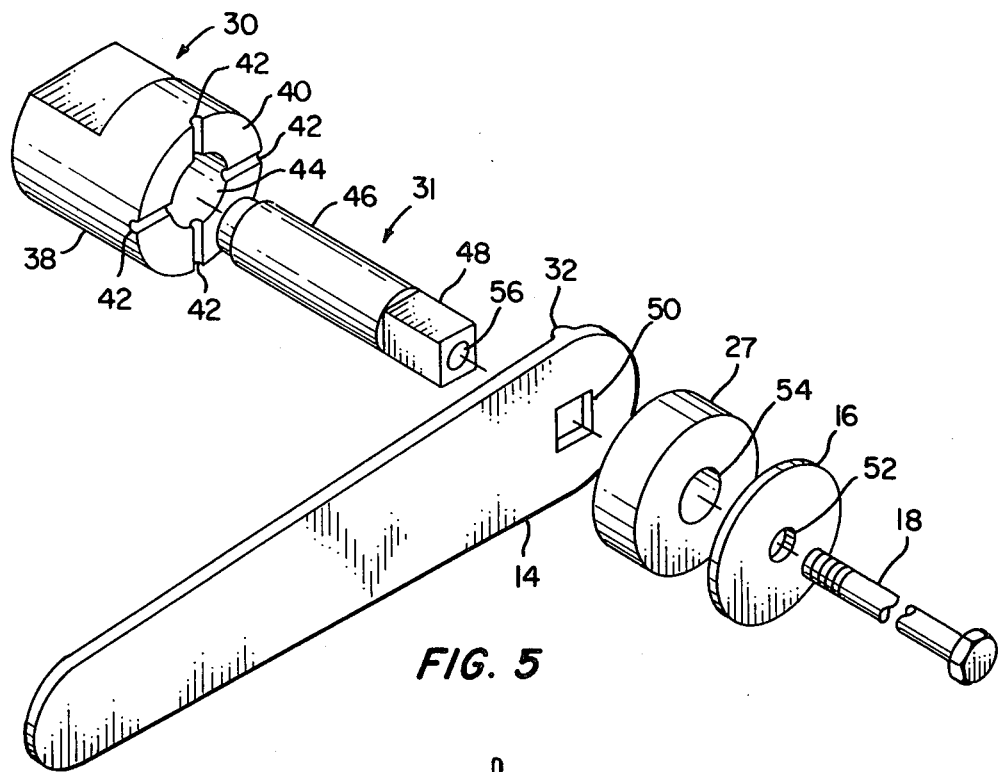
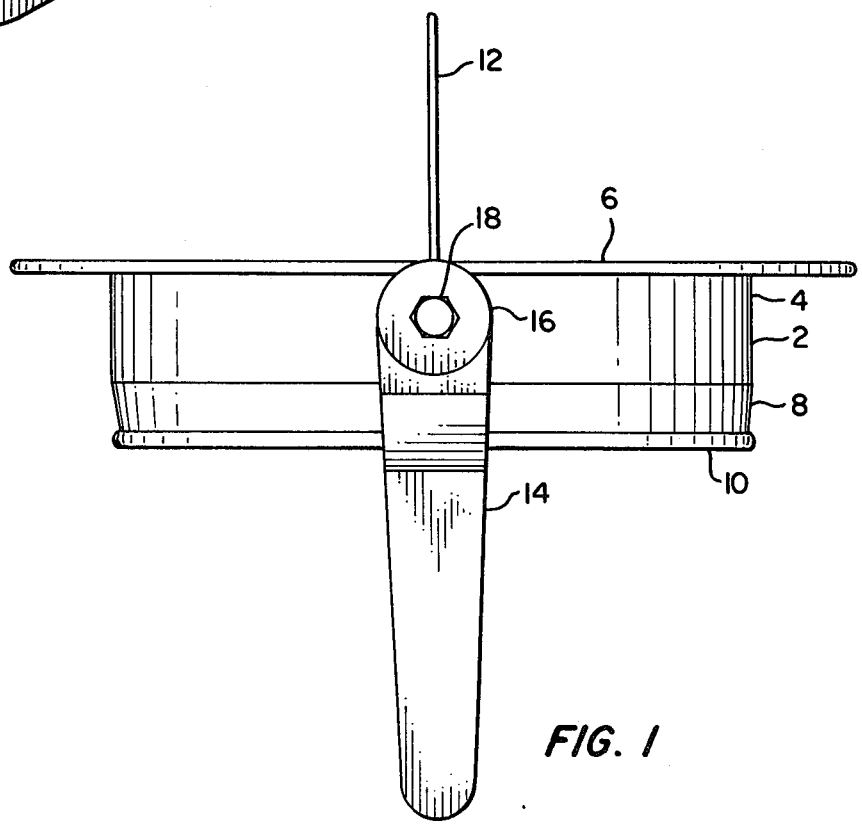

DISCHARGE VALVE FOR GRANULAR MATERIALS

BACKGROUND OF THE INVENTION

Disc or butterfly type valves are well known in the art. Essentially these valves include a disc which is pivoted to open the valve and to thereby control the flow of, among other things, granular materials such as encountered in, for example, pharmaceutical and food industries. The valves may be used in conjunction with hoppers, transport equipment, process machinery, suction pipes, drums and other container equipment.

The aforenoted uses require that a seal be provided between the valve disc and valve body when the valve is closed. The valves must be easily disassembled for cleaning purposes and various disc positions are required for proper material flow control. Additionally, the valves must be readily adaptable for communication with inlet and/or outlet members for receiving the material and for discharging the material in controlled flow into a drum or container or for communication with, for example, a mounting spacer, whereby the valve is mounted between two material transfer tubes.

SUMMARY OF THE INVENTION

This invention contemplates a discharge valve for granular materials and the like, including a metallic valve body and a metallic disc pivotally supported within the body and pivoted through a handle to open and close the valve. When the valve is closed, the disc abuts circumferential ledges disposed with the body so that a metal-to-metal closure is provided. The handle is secured to the disc through a stem which communicates with a bushing having a plurality of detents. The handle has a protrusion and is biased through resilient means so that the protrusion engages one of the plurality of the detents as the handle is turned to vary the degree to which the valve is opened and to control the flow of material. The inlet and outlet ends of the valve are adapted to communicate with material transfer members.

BRIEF DESCRIPTION OF THE DRAWINGS

FIG. 1 is a diagrammatic end view showing a valve according to the invention.

FIG. 5 is an exploded view of a valve handle and detent arrangement whereby the valve disc is positioned to a plurality of open positions.

DETAILED DESCRIPTION OF THE INVENTION

Figure 2:
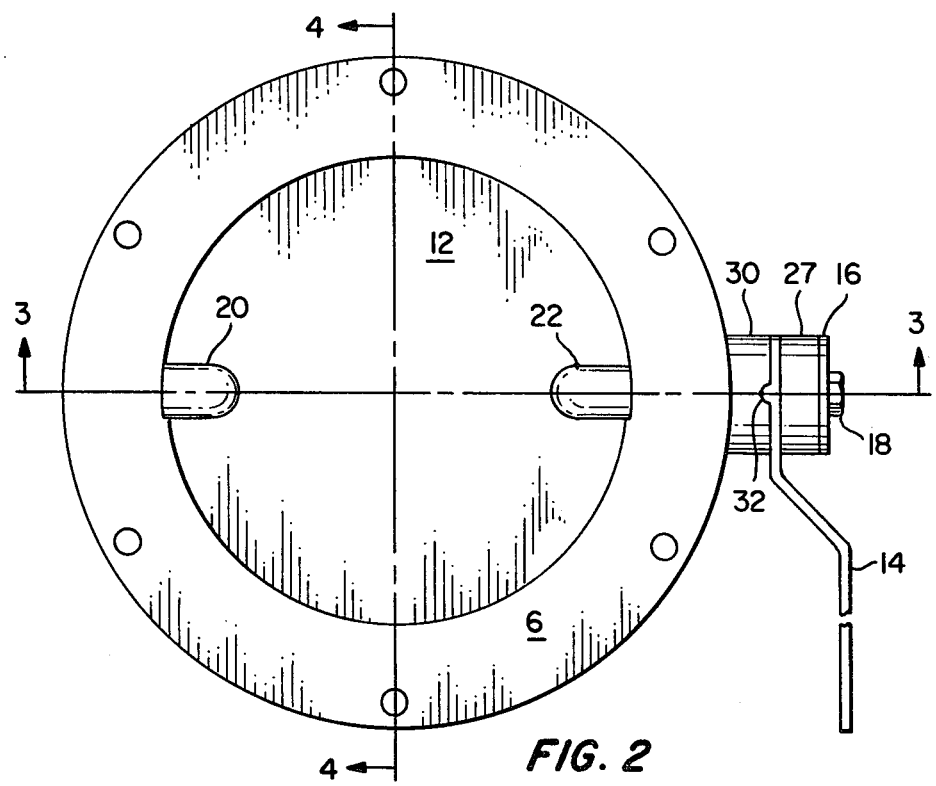
FIG. 2 is a top plan view of the valve.

With reference to FIG. 1 the valve of the invention is shown as including a valve body 2 having an upper or inlet portion 4 carrying a circumferential flange 6 and lower or outlet portion 8 carrying a circumferential ring 10.

A disc 12 is pivotally supported within body 2 in a manner which will be hereinafter more fully described with reference to FIGS. 2-5.

A handle 14 is secured to disc 12 through means including a retaining washer 16 and a bolt 18 and is manually operable for varying the position of disc 12 to open and close the valve. Disc 12 is shown in the fully open position in FIG. 1. It will be understood by those skilled in the art that handle 14 may be power operated by pneumatic or other means as may be desirable for certain applications.

Valve base 2, disc 12, handle 14 and retaining washer 16 are preferably of stainless steel. Flange 6 is adaptable for being coupled to an input material transfer member such as a conduit or the like (now shown) and ring 10 is adaptable for receiving an outlet material transfer member such as a boot or the like (not shown).

Figure 3:
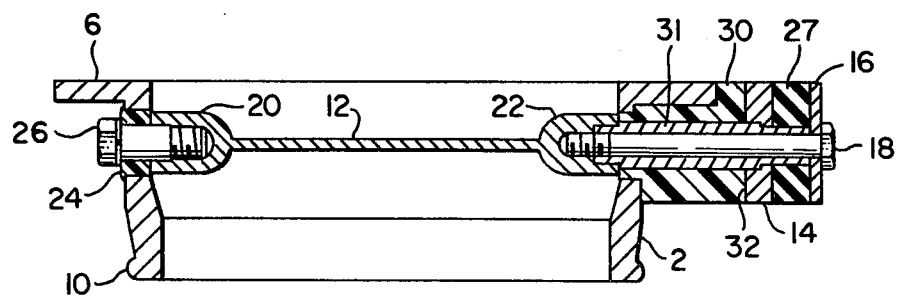
FIG. 3 is a sectional view taken along the line 3—3 in FIG. 2.
Figure 4:
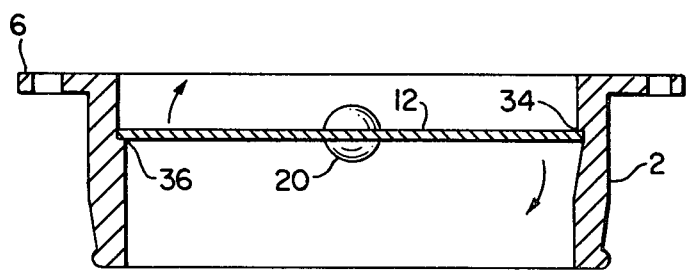
FIG. 4 is a sectional view taken along the line 4—4 in FIG. 2.

With reference now to FIGS. 2, 3, and 4, disc 12 includes pivots 20 and 22 extending from opposite sides thereon. A nylon bushing 24 extends through one side of valve base 2 and a bolt 26 extends through bushing 24 to engage pivot 20 in threaded engagement.

Handle 14 is assembled to disc 12 through retaining washer 16, a resilient member 27 which may be of a silicon elastomer, a nylon bushing 30 and a stainless steel valve stem 31. Handle 14 carries a protrusion 32 for purposes which will be hereinafter explained.

Thus, handle 14 is sandwiched between resilient member 27 and bushing 30. Bushing 30 extends through the side of valve body 2 opposite the side through which bushing 24 extends. Bolt 18 extends through washer 16, resilient member 27, handle 14, bushing 30 and valve stem 31 to engage pivot 22 in threaded engagement. With the arrangement shown and described, resilient member 27 functions to bias handle 14 against bushing 30 which engages protrusion 32 as will be explained with reference to FIG. 5.

With particular reference to FIG. 4, wherein the valve of the invention is shown in the fully closed position, the upper surface of disc 12 abuts a downwardly disposed ledge 34 and the lower surface of disc 12 abuts an upwardly disposed ledge 36, and which ledges 34 and 36 extend circumferentially in spaced relation within valve body 2. The disc is displaced in a clockwise direction as shown by the arrows via handle 14 away from ledges 34 and 36 for opening the valve. The valve is fully opened when disc 12 is normal to the axis of valve body 2 as shown in FIG. 1.

With particular reference now to FIG. 5, bushing 30 includes a body portion 38 which extends through valve body 2 and a face portion 40 having a plurality of detents shown as four in number and designated by the numeral 42 radiating from the center of face 40 to the outer edge thereof. A bore 44 extends through bushing 30.

Valve stem 31 includes a cylindrical portion 46 which is received by bore 44 in bushing 30 and a rectangular portion 48. Handle 14 includes a rectangular aperture 50 which engages rectangular portion 48 of valve stem 31 in wrench-like fashion. When the handle is assembled, bolt 18 extends through holes 52 and 54 in washer 16 and resilient member 27, respectively. The bolt extends through a hole 56 in valve stem 31 and extends through bushing 30 to engage pivot 22 as shown in FIG. 3. As heretofore noted, resilient member 27 biases handle 14 against bushing face 40 so that upon exertion of a rotating force on handle 14, protrusion 32 engages a detent 42 in bushing face 40 to selectively position disc 12 for opening the valve in varying degrees and for thereby controlling the flow of material therethrough.

In the preferred embodiment of the invention the valve herein described is intended for being coupled to an inlet material transfer member (not shown) through flange 6 and to an outlet material transfer member (not shown) through ring 10. For purposes of illustration, flange 6 may engage a like flange on the inlet material transfer member, while ring 10 may engage an outlet boot. Other adaptations of the inlet and outlet portions of the valve may be made as will now be recognized by those skilled in the art. Although the valve has been shown as being round, valves of other shapes will serve the purpose of the invention as well.

The advantageous features of the valve herein described are now evident. For example, the stainless steel valve components provide for easy cleaning of the valve and ensure a metal-to-metal seal between valve body 2 and disc 12 when the valve is closed as illustrated in FIG. 4. The construction of the valve leads to simplified assembly and disassembly with only bolts 18 and 26 affecting the same.

The valve may be opened in varying degrees through handle protrusion 32 and detents 42 as illustrated in FIG. 5.

Further, the valve is adaptable for being coupled to a variety of inlet and outlet material transfer members. Reference is now to be had to the appended claims which define the scope of the invention.

Having thus described the invention, what is claimed is:

1. A discharge valve for granular materials and the like, comprising:
   a metallic valve body having a pair of circumferential ledges disposed in spaced relation therewithin;
   a metallic disc and means for pivotally supporting the disc within the valve body including a first pivot extending from one side of the disc and a second pivot extending from the opposite side of the disc, a first bushing extending through one side of the valve body and a second bushing extending through the opposite side of the valve body, first means extending through the first bushing and engaging the first pivot, and second means extending through the second bushing and engaging the second pivot;
   a handle and means for coupling the handle to the supporting means, with the handle being operable for opening and closing the valve, said handle coupling means including one of the first and second bushings being adapted for receiving a stem having a portion extending beyond said one bushing and external to the valve body, the extending portion of the stem being adapted for receiving the handle, and one of the first and second means extending through the handle and the stem and engaging one bushing for coupling the handle to said bushing;
   the disc having a surface abutting one of the circumferential ledges and an opposite surface abutting the other of the ledges to provide a metal-to-metal seal when the valve is fully closed, the handle being operable for pivoting the disc away from the ledges to open the valve and to pivot the disc toward the ledges for closing the valve; and
   the means for coupling the handle to the supporting means including means for varying the degree to which the disc is pivoted to open and close the valve, said varying means including the one bushing have a face carrying a plurality of detents extending radially from the center to the outer edge thereof, the handle having a protrusion, and a resilient member engaged by the one of the first and second means biasing the handle against the face of the one bushing so that upon exertion of a rotating force on the handle the handle protrusion selectively engages one of the plurality of detents to vary the degree to which the disc is pivoted to open and close the valve; and
   the resilient member being a disc-like member of a relatively resilient material and having a hole extending therethrough, the handle sandwiched between the resilient member and the one bushing with the resilient member having a side abutting the handle, a retaining washer having a hole extending therethrough disposed on the one side of the resilient member opposite the side thereof abutting the handle, and the one of the first and second means extending through the handle and the stem and engaging the one bushing for coupling the handle to said bushing extending through the holes in the resilient member and the retaining washer.

2. A discharge valve as described by claim 1, wherein:
   the valve body has an inlet end which is adapted to be coupled to an inlet material transfer member and an outlet end adapted to be coupled to an outlet material transfer member.

* * * * *